United States Patent
Guo et al.

(10) Patent No.: US 12,534,604 B2
(45) Date of Patent: Jan. 27, 2026

(54) POLYMER COMPOSITION HAVING IMPROVED IMPACT STRENGTH AT LOW TEMPERATURES

(71) Applicant: SABIC GLOBAL TECHNOLOGIES B.V., Bergen op Zoom (NL)

(72) Inventors: Kai Guo, Shanghai (CN); Dimphna Johanna Maria Van Beek, Sittard (NL); Philip Smith, Mooresville, NC (US); Li Yuan, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 670 days.

(21) Appl. No.: 17/914,831

(22) PCT Filed: Mar. 29, 2021

(86) PCT No.: PCT/EP2021/058154
§ 371 (c)(1),
(2) Date: Sep. 27, 2022

(87) PCT Pub. No.: WO2021/191466
PCT Pub. Date: Sep. 30, 2021

(65) Prior Publication Data
US 2023/0146490 A1    May 11, 2023

(30) Foreign Application Priority Data
Mar. 27, 2020  (WO) ............... PCT/CN2020/081628
Apr. 10, 2020  (EP) ..................................... 20169164

(51) Int. Cl.
*C08L 23/14*    (2006.01)
(52) U.S. Cl.
CPC ......... *C08L 23/14* (2013.01); *C08L 2205/025* (2013.01); *C08L 2205/06* (2013.01); *C08L 2207/02* (2013.01); *C08L 2207/10* (2013.01)
(58) Field of Classification Search
CPC ....................................................... C08L 23/14
USPC ........................................................ 524/451
See application file for complete search history.

(56) References Cited

U.S. PATENT DOCUMENTS

| | | | |
|---|---|---|---|
| 4,399,054 A | 8/1983 | Ferraris et al. | |
| 4,472,524 A | 9/1984 | Albizzati | |
| 4,771,024 A | 9/1988 | Nestlerode et al. | |
| 4,866,022 A | 9/1989 | Arzoumanidis et al. | |
| 5,093,415 A | 3/1992 | Brady, III et al. | |
| 6,825,146 B2 | 11/2004 | Kilty et al. | |
| 2009/0105397 A1 | 4/2009 | Van Riel et al. | |
| 2015/0166850 A1* | 6/2015 | Tse .................. | C09J 123/12 |
| | | | 525/240 |
| 2018/0127526 A1* | 5/2018 | Hlavinka ............ | C08L 23/0815 |

FOREIGN PATENT DOCUMENTS

| | | | | |
|---|---|---|---|---|
| EP | 0019330 A1 | 5/1980 | | |
| EP | 1273595 A1 | 1/2003 | | |
| EP | 2530117 A1 | 12/2012 | | |
| EP | 2669330 A1 | 12/2013 | | |
| EP | 2947118 A1 | 11/2015 | | |
| WO | 9632426 A1 | 10/1996 | | |
| WO | 03068828 A1 | 8/2003 | | |
| WO | 2004009657 A1 | 1/2004 | | |
| WO | 2006010414 A1 | 2/2006 | | |
| WO | 2007134851 A1 | 11/2007 | | |
| WO | 2015091810 A1 | 6/2015 | | |
| WO | 2015091983 A1 | 6/2015 | | |
| WO | WO-2017041296 A1 * | 3/2017 | ............ | C08F 210/06 |
| WO | WO-2018200318 A1 * | 11/2018 | ............. | C08L 23/14 |
| WO | 2019030123 A1 | 2/2019 | | |

OTHER PUBLICATIONS

International Search Report for the corresponding International Application No. PCT/EP2021/058154; Date of Mailing: Jul. 16, 2021; 3 pages.
Written Opinion for the corresponding International Application No. PCT/EP2021/058154; Date of Mailing: Jul. 16, 2021; 6 pages.

* cited by examiner

*Primary Examiner* — Deve V Hall
(74) *Attorney, Agent, or Firm* — CANTOR COLBURN LLP

(57) ABSTRACT

A polymer composition includes: (a) a propylene-based polymer having a melt mass-flow rate of $\geq 5.0$ and $\leq 90.0$ g/10 min; and (b) $\geq 5.0$ and $\leq 30.0$ wt %, with regard to the total weight of the polymer composition, of an ethylene-based polymer having: a melt mass-flow rate of 3.0 and $\leq 30.0$ g/10 min; a density of $\geq 840$ and $\leq 870$ kg/m$^3$; and a content of $\geq 25.0$ and $\leq 50.0$ wt % of moieties derived from 1-octene, with regard to the total weight of the ethylene-based polymer. Such polymer composition demonstrates improved low temperature impact strength, determined as Izod impact strength at $-40°$ C. and/or at $-30°$ C., as well as desirable toughness, determined as tensile modulus, whilst having good flowability in injection moulding and thereby allowing complex, thin-walled objects to be shaped.

20 Claims, No Drawings

POLYMER COMPOSITION HAVING IMPROVED IMPACT STRENGTH AT LOW TEMPERATURES

CROSS REFERENCE TO RELATED APPLICATIONS

This application is a National Stage application of PCT/EP2021/058154, filed Mar. 29, 2021, which claims the benefit of International Application No.: PCT/CN2020/081628, filed Mar. 27, 2020, and European Application No. 20169164.9, filed Apr. 10, 2020, all of which are incorporated by reference in their entirety herein.

BACKGROUND

The present invention relates to a polymer composition having improved impact strength at low temperatures. The invention also relates to articles comprising the polymer composition.

In order to comply with requirements for use in certain kinds of applications, polymer compositions are to present a certain set of properties. In applications such as for example automotive applications, is it paramount that the materials that are used in such applications comply with criteria including desirably high mechanical properties and desirable durability, to name only a few, where further also properties such as low weight of the materials are particularly appreciated in order for the material to qualify for the particular application.

In applications such as automotive applications, polymer compositions comprising polyolefin-based materials are abundantly used. Such materials may be designed so that they are well processable, allow for a wide variety of opportunities of design of an article, and can provide for properties to the article as described above. On the basis of specific requirements that apply to each particular application, or family of applications, specifically designed polyolefin-based materials or compositions comprising polyolefin-based materials are manufactured to meet the needs.

A particular need that exists in a variety of applications, such as in many automotive parts that are used in the interior or the exterior of a vehicle, is that the parts must be able to withstand impact forces at low temperature, that is that they must be able to maintain their structural integrity even when subjected to forces exerted onto the article at low temperatures, such as at when receiving bumps or when objects are positioned on top of such parts with certain force, such as for example when objects are stowed in the baggage compartment of a vehicle, or when parts such as covers are manually closed, to name a few instances where numerous further instances can be contemplated.

In order to provide the material from which the object is made with such properties, in material design one has to introduce a certain degree of toughness into the material. Particular polymer compositions that may be well suitable for such applications are polymer compositions comprising polypropylene-type polymers and olefin-based impact modifiers. In development of such suitable compositions, further considerations are to be made regarding the processability of the material during its shaping process. Such shaping of polymer compositions comprising polyolefin-based materials is typically performed via injection moulding, in which material is brought to melt and subsequently forced via one or more apertures into a mould that has the shape of the part that is to be produced. After the mould being filled with the molten material, the mould and the material contained therein are cooled so that the material solidifies, and the part having its desired shape can then be collected from the mould.

In order to allow for minimized consumption of material, it is typically desirable that the thickness of the article that is produced is kept as low as possible, whilst still allowing for the mechanical strength to be maintained. During the stage of injection moulding, the void of the mould may, as a result of this desire to minimise the article thickness or wall thickness, be relatively narrow. In combination with the complex nature of certain shapes of object that are to be manufactured via such injection moulding process, this means that the material has to have a certain high melt flow characteristic, in order to ensure that all parts of a mould, even those that are most difficult to access, are filled by the molten material before solidification of the material starts to occur. Therefore, the material composition that is used in injection moulding needs to have a certain high melt flowability.

However, the introduction of material into such composition to increase the toughness of the composition typically results in a reduction of the flowability under molten conditions of such polymer composition. Materials that are conventionally used to increase the toughness are rubber-like materials, which typically exhibit relatively poor flowing behaviour.

Accordingly, there remains a need to provide polymer compositions that can be used to manufacture articles having desirably high impact strength at low temperatures, as well as desirably high toughness, but which exhibit desirably good melt flow allowing the materials to be shaped by injection moulding into complex, thin-walled articles.

SUMMARY

This has now been achieved according to the present invention by a polymer composition comprising:
 (a) a propylene-based polymer having a melt mass-flow rate of $\geq 5.0$ and $\leq 90.0$ g/10 min, preferably $\geq 10.0$ and $\leq 50.0$ g/10 min, as determined in accordance with ASTM D1238 (2013) at 230° C. under a load of 2.16 kg; and
 (b) $\geq 5.0$ and $\leq 30.0$ wt %, preferably $\geq 15.0$ and $\leq 30.0$ wt %, with regard to the total weight of the polymer composition, of an ethylene-based polymer having:
  a melt mass-flow rate of $\geq 3.0$ and $\leq 30.0$ g/10 min, as determined in accordance with ASTM D1238 (2013) at 190° C. under a load of 2.16 kg;
  a density of $\geq 840$ and $\leq 870$ kg/m$^3$, as determined in accordance with ASTM D792 (2008); and
  a content of $\geq 25.0$ and $\leq 50.0$ wt % of moieties derived from 1-octene, with regard to the total weight of the ethylene-based polymer.

Such polymer composition demonstrates improved low temperature impact strength, determined as Izod impact strength at −40° C. and/or at −30° C., as well as desirable toughness, determined as tensile modulus, whilst having good flowability in injection moulding and thereby allowing complex, thin-walled objects to be shaped.

DETAILED DESCRIPTION

In the context of the present invention, the melt mass-flow rate may also be referred to as the MFI.

For example, the ethylene-based polymer may have a density of $\geq 845$ and $\leq 870$ kg/m$^3$, preferably of $\geq 845$ and ≤865 kg/m³, more preferably of ≥850 and ≤865 kg/m³, even more preferably of ≥850 and ≤860 kg/m³.

For example, the ethylene-based polymer may comprise ≥30.0 and ≤50.0 wt % of moieties derived from 1-octene, with regard to the total weight of the ethylene-based polymer, preferably ≥30.0 and ≤45.0 wt %, more preferably ≥35.0 and ≤45.0 wt %.

For example, the ethylene-based polymer may have melt mass-flow rate of ≥3.0 and ≤25.0 g/10 min, as determined in accordance with ASTM D1238 (2013) at 190° C. under a load of 2.16 kg, preferably of ≥3.0 and ≤20.0 g/10 min, more preferably of ≥3.0 and ≤15.0 g/10 min, even more preferably of ≥3.0 and ≤10.0 g/10 min.

In certain embodiments, the polymer composition may for example comprise an inorganic filler. Preferably, the polymer composition comprises ≥2.5 and ≤25.0 wt %, more preferably ≥10.0 and ≤20.0 wt %, of the inorganic filler, with regard to the total weight of the polymer composition, preferably wherein the inorganic filler is a talc.

The polymer composition may for example comprise ≥30.0 and ≤95.0 wt % of the propylene-based polymer with regard to the total weight of the polymer composition, preferably ≥40.0 wt % and ≤80.0 wt %, more preferably ≥50.0 wt % and ≤70.0 wt %.

The propylene-based polymer may for example be a propylene homopolymer, a random copolymer of propylene with ethylene, 1-butene and/or 1-hexene, a heterophasic propylene copolymer, or mixtures thereof. Such heterophasic propylene copolymer may for example consist of a matrix phase and a dispersed phase, wherein:
- the matrix phase comprises moieties derived from propylene;
- the dispersed phase is an ethylene-α-olefin copolymer comprising moieties derived from ethylene and moieties derived from an α-olefin having 3 to 8 carbon atoms, preferably wherein the α-olefin is propylene; and
- the matrix phase forms the continuous phase.

The propylene-based polymer employed in the composition according to present invention can be produced using any conventional technique known to the skilled person, for example a multistage process polymerization, such as bulk polymerization, gas phase polymerization, slurry polymerization, solution polymerization or any combinations thereof. Any conventional catalyst systems, for example, Ziegler-Natta or metallocene may be used. Techniques and catalysts for the preparation of propylene homopolymers, random propylene copolymers and heterophasic propylene copolymers are described, for example in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524. Preferably, the polypropylene is made using Ziegler-Natta catalyst.

Heterophasic propylene copolymers are generally prepared in one or more reactors, by polymerization of propylene in the presence of a catalyst and subsequent polymerization of ethylene with α-olefins. The resulting polymeric materials are heterophasic, but the specific morphology usually depends on the preparation method and monomer ratios used.

The heterophasic propylene copolymer may be prepared by a process comprising
- polymerizing propylene and optionally ethylene and/or α-olefin in the presence of a catalyst system to obtain the propylene-based matrix and
- subsequently polymerizing ethylene with α-olefins in the presence of a catalyst system in the propylene-based matrix to obtain the heterophasic propylene copolymer consisting of a propylene-based matrix and a dispersed phase. These steps are preferably performed in different reactors. The catalyst systems for the first step and for the second step may be different or same.

Ziegler-Natta catalyst systems are well known in the art. The term normally refers to catalyst systems comprising a transition metal containing solid catalyst compound (procatalyst) and an organo-metal compound (co-catalyst). Optionally one or more electron donor compounds (external donor) may be added to the catalyst system as well.

The transition metal in the transition metal containing solid catalyst compound is normally chosen from groups 4-6 of the Periodic Table of the Elements (Newest IUPAC notation); more preferably, the transition metal is chosen from group 4; the greatest preference is given to titanium (Ti) as transition metal.

Although various transition metals are applicable, the following is focused on the most preferred one being titanium. It is, however, equally applicable to the situation where other transition metals than Ti are used. Titanium containing compounds useful in the present invention as transition metal compound generally are supported on hydrocarbon-insoluble, magnesium and/or an inorganic oxide, for instance silicon oxide or aluminum oxide, containing supports, generally in combination with an internal electron donor compound. The transition metal containing solid catalyst compounds may be formed for instance by reacting a titanium (IV) halide, an organic internal electron donor compound and a magnesium and/or silicon containing support. The transition metal containing solid catalyst compounds may be further treated or modified with an additional electron donor or Lewis acid species and/or may be subjected to one or more washing procedures, as is well known in the art.

Some examples of Ziegler-Natta (pro)catalysts and their preparation method which can suitably be used to prepare the heterophasic propylene copolymer (A) can be found in EP 1 273 595, EP 0 019 330, U.S. Pat. No. 5,093,415, Example 2 of U.S. Pat. Nos. 6,825,146, 4,771,024 column 10, line 61 to column 11, line 9, WO03/068828, U.S. Pat. No. 4,866,022, WO96/32426A, example I of WO 2007/134851 A1 and in WO2015/091983 all of which are hereby incorporated by reference.

The (pro)catalyst thus prepared can be used in polymerization of the heterophasic propylene copolymer using an external donor, for example as exemplified herein, and a co-catalyst, for example as exemplified herein.

The catalyst system includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst as are known to the skilled person. Preferably, the cocatalyst is selected from trimethylaluminium, triethylaluminum, tri-isobutylaluminum, trihexylaluminum, di-isobutylaluminum hydride, trioctylaluminium, dihexylaluminum hydride and mixtures thereof, most preferably, the cocatalyst is triethylaluminium (abbreviated as TEAL).

Examples of external donors are known to the person skilled in the art and include but are not limited to external electron donors chosen from the group of compounds having a structure according to Formula III $(R^{90})_2N—Si(OR^{91})_3$, compounds having a structure according to Formula IV: $(R^{92})Si(OR^{93})_3$ and mixtures thereof, wherein each of $R^{90}$, $R^{91}, R^{92}$ and $R^{93}$ groups are each independently a linear, branched or cyclic, substituted or unsubstituted alkyl having from 1 to 10 carbon atoms, preferably wherein $R^{90}$, $R^{91}, R^{92}$ and $R^{93}$ groups are each independently a linear unsubstituted alkyl having from 1 to 8 carbon atoms, for example ethyl, methyl or n-propyl, for example diethylaminotriethoxysilane (DEATES), n-propyl triethoxysilane, (nPTES), n-propyl trimethoxysilane (nPTMS); and organosilicon compounds having general formula $Si(OR^a)_{4-n}R^b_n$, wherein n can be from 0 up to 2, and each of $R^a$ and $R^b$, independently, represents an alkyl or aryl group, optionally containing one or more hetero atoms for instance O, N, S or P, with, for instance, 1-20 carbon atoms; such as diisobutyl dimethoxysilane (DiBDMS), t-butyl isopropyl dimethyxysilane (tBuPDMS), cyclohexyl methyldimethoxysilane (CHMDMS), dicyclopentyl dimethoxysilane (DCPDMS) or di(iso-propyl) dimethoxysilane (DiPDMS). More preferably, the external electron donor is chosen from the group of di(iso-propyl) dimethoxysilane (DiPDMS) or diisobutyl dimethoxysilane (DiBDMS).

The heterophasic propylene copolymer in the composition of this special embodiment of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR or by determining the amounts made during the polymerization, as well known in the art.

The propylene-based matrix consists of a propylene homopolymer.

For purpose of the present invention, propylene unit refers to the moiety derived from propylene which is incorporated into the polymer chain during the polymerization; Mutatis mutandis, comonomer unit refers to the moiety derived from the respective comonomer which is incorporated into the polymer chain during the polymerization.

The propylene-based matrix is preferably present in an amount of 65 to 90 wt % based on the total heterophasic propylene copolymer.

For a good stiffness, it is preferred that the propylene homopolymer in the propylene-based matrix has an isotacticity of at least 96.5 wt % based on the propylene homopolymer. For example, the isotacticity of the propylene homopolymer in the propylene-based matrix is at most 99 wt %. The isotacticity is determined using $^{13}$C NMR.

The propylene-based matrix is preferably semi-crystalline, that is, it is not 100% amorphous, nor is it 100% crystalline. For example, the propylene-based matrix has a crystallinity of at least 40%, for example at least 50% and/or for example at most 80%. For example, the propylene-based matrix has a crystallinity in the range from 40% to 80%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also consists of a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range from 0.05 to 2.0 microns, as may be determined by transmission electron microscopy (TEM). The amount of the dispersed ethylene-α-olefin copolymer in the heterophasic propylene copolymer may herein be sometimes referred as RC and can be determined using $^{13}$C NMR.

The dispersed ethylene-α-olefin copolymer is present in the heterophasic propylene copolymer (A) in an amount from 10.0 to 35.0 wt % based on the heterophasic propylene copolymer.

The amount of ethylene monomer units in the ethylene-α-olefin copolymer is preferably from 30 to 62 wt % based on the ethylene-α-olefin copolymer. Preferably the amount of ethylene monomer units in the ethylene-α-olefin copolymer is at least 30 wt %, preferably at least 35 wt %, preferably at least 40 wt % and/or preferably at most 62 wt %, preferably at most 55 wt %, preferably at most 53 wt % based on the ethylene-α-olefin copolymer. The amount of ethylene monomer units in the dispersed ethylene-α-olefin copolymer in the heterophasic propylene copolymer may herein be sometimes referred as RCC2.

The α-olefin units in the ethylene-α-olefin copolymer are preferably chosen from the group of units of α-olefins having 3 to 8 carbon atoms. Examples of suitable units of α-olefins having 3 to 8 carbon atoms include but are not limited to units of propylene, 1-butene, 1-pentene, 4-methyl-1-pentene, 1-hexene, 1-heptene and 1-octene. More preferably, the α-olefin units in the ethylene-α-olefin copolymer are chosen from the group of units of α-olefins having 3 to 4 carbon atoms and any mixture thereof, more preferably the α-olefin units are propylene units, in which case the ethylene-α-olefin copolymer is ethylene-propylene copolymer.

The MFI of the dispersed ethylene α-olefin copolymer in the heterophasic propylene copolymer MFIrubber, may be for example at least 0.0010 dg/min, at least 0.010 dg/min, at least 0.050 dg/min, at least 0.10, and/or for example at most 10 dg/min, at most 7.0 dg/min, at most 5.0 dg/min at most 3.0 dg/min, at most 1.0 dg/min or at most 0.50 dg/min. The MFIrubber may be in the range for example from 0.0010 to 10 dg/min, for example from 0.010 to 7.0 dg/min, preferably from 0.050 to 5.0 dg/min, for example from 0.10 to 3.0 dg/min, for example from 0.10 to 1.0 dg/min, wherein the $MFI_{rubber}$ is calculated according to the following formula:

$$MFIrubber = 10^{\left(\frac{\text{Log } MFIheterophasic - \text{matrix content} * \text{Log } MFImatrix}{\text{rubber content}}\right)}$$

Wherein:
MFIheterophasic is the MFI (dg/min) of the heterophasic propylene copolymer measured according to ISO1133-1:2011 (2.16 kg/230° C.),
MFImatrix is the MFI (dg/min) of the propylene-based matrix measured according to ISO1133-1:2011 (2.16 kg/230° C.),
matrix content is the fraction of the propylene-based matrix in the heterophasic propylene copolymer,
rubber content is the fraction of the dispersed ethylene-α-olefin copolymer in the heterophasic propylene copolymer. For the avoidance of any doubt, Log in the formula means $\log_{10}$.

In the heterophasic propylene copolymer in the composition of the invention, the sum of the weight of the propylene-based matrix and the weight of the dispersed ethylene-α-olefin copolymer is 100 wt % based on the heterophasic propylene copolymer.

Preferably, the propylene-based matrix is a propylene homopolymer and the dispersed ethylene-α-olefin copolymer is an ethylene-propylene copolymer.

Examples of suitable inorganic fillers include but are not limited to: talc, calcium carbonate, mia, kaolin, clay and/or barium sulphate. Preferably, the inorganic filler is talc.

In one embodiment, the talc is a fine talc. The mean particle size of talc ($D_{50}$) of talc is preferably in the range from 0.12 to 10.2 µm, preferably in the range from 0.23 to 5.1 µm, more preferably in the range from 0.36 to 0.86 µm, as determined according to ISO 13317-3:2001, sedimentation analysis, Stokes' law.

In another embodiment, the talc is a high aspect ratio (HAR) talc. "high aspect ratio (HAR) talc" as used in the present description means a talc having a high aspect ratio, such as talc having a lamellarity of at least 2.8. "aspect ratio" as used in the present description means a ratio of the smallest diameter of a talc particle over the largest diameter of a talc particle orthogonal to the smallest diameter. The aspect ratio approaching zero for a very elongated particle to 1 for a round particle.

The polymer composition of the invention may further comprise additives. Examples of suitable additives (D) include but are not limited to UV stabilizers, hindered amine stabilizers (HALS), process stabilisers such as phosphites, (phenolic) antioxidants, acid scavengers, lubricants, processing aids, slip agent, antiscratch agents and nucleating agents. Additives may for example be present in the polymer composition of the invention in an amount from 0.10 to 2.5 wt % based on the total weight of the polymer composition.

The ethylene-based polymer may for example have a fraction that is eluted in analytical temperature rising elution fractionation (a-TREF) at a temperature ≤30.0° C. of ≤7.5 wt %, preferably ≥5.0 and ≤7.5 wt %. It is preferred that the ethylene-based polymer has a single distinct peak in the a-TREF curve in the elution temperature range of between 50.0 and 90.0° C., preferably wherein the peak occurs at a temperature of ≤70.0° C., more preferably at a temperature of ≥60.0 and ≤70.0° C.

In certain embodiments of the invention, the ethylene-based polymer may for example have:
- a weight-average molecular weight ($M_w$) of ≥75,000 and ≤125,000 g/mol, preferably of ≥90,000 and ≤110,000 g/mol, as determined in accordance with ASTM D6474 (2012);
- a number-average molecular weight ($M_n$) of ≥40,000 and ≤70,000 g/mol, preferably of ≥45,000 and ≤60,000 g/mol, as determined in accordance with ASTM D6474 (2012); and/or
- a molecular weight distribution ($M_w/M_n$) of ≤2.1, preferably of ≥1.8 and ≤2.1.

According to the invention, analytical temperature rising elution fractionation, also referred to as a-TREF, may be carried out using a Polymer Char Crystaf-TREF 300 equipped with stainless steel columns having a length of 15 cm and an internal diameter of 7.8 mm, with a solution containing 4 mg/ml of sample prepared in 1,2-dichlorobenzene stabilised with 1 g/l Topanol CA (1,1,3-tri(3-tert-butyl-4-hydroxy-6-methylphenyl)butane) and 1 g/l Irgafos 168 (tri(2,4-di-tert-butylphenyl) phosphite) at a temperature of 150° C. for 1 hour. The solution may be further stabilised for 45 minutes at 95° C. under continuous stirring at 200 rpm before analyses. For analyses, the solution was crystallised from 95° C. to 30° C. using a cooling rate of 0.1° C./min. Elution may be performed with a heating rate of 1° C./min from 30° C. to 140° C. The set-up may be cleaned at 150° C. The sample injection volume may be 300 µl, and the pump flow rate during elution 0.5 ml/min. The volume between the column and the detector may be 313 µl. The fraction that is eluted at a temperature of ≤30.0° C. may in the context of the present invention be calculated by subtracting the sum of the fraction eluted >30.0° C. from 100%, thus the total of the fraction eluted ≤30.0° C., and the fraction eluted >30.0° C. to add up to 100.0 wt %.

Particularly, a-TREF may be carried out using a Polymer Char Crystaf-TREF 300 using a solution containing 4 mg/ml of the polymer in 1,2-dichlorobenzene, wherein the solution is stabilised with 1 g/l 1,1,3-tri(3-tert-butyl-4-hydroxy-6-methylphenyl)butane and 1 g/l tri(2,4-di-tert-butylphenyl) phosphite) at a temperature of 150° C. for 1 hour, and further stabilised for 45 minutes at 95° C. under continuous stirring at 200 rpm, wherein the prior to analyses the solution is crystallised from 95° C. to 30° C. using a cooling rate of 0.1° C./min, and elution is performed at a heating rate of 1° C./min from 30° C. to 140° C., and wherein the equipment has been cleaned at 150° C.

The ethylene, propylene and comonomer content and the comonomer type of the propylene-based polymer and of the ethylene-based polymer may be determined by $^{13}$C NMR, such as on a Bruker Avance 500 spectrometer equipped with a cryogenically cooled probe head operating at 125° C., whereby the samples are dissolved at 130° C. in $C_2D_2Cl_4$ containing DBPC as stabiliser.

The composition may be prepared by melt-mixing a mixture comprising the propylene-based polymer, the ethylene-based polymer, and optionally the inorganic filler and the additives by using any suitable means. Accordingly, the invention further relates to a process for the preparation of the composition according to the invention comprising melt mixing a mixture comprising the propylene-based polymer, the ethylene-based polymer, and optionally the inorganic filler and the additives.

The melt-mixing of the components may be done in any order. Preferably, the composition of the invention is made in a form that allows easy processing into a shaped article in a subsequent step, like in pellet or granular form. The composition can be a mixture of different particles or pellets; Preferably, the composition of the invention is in pellet or granular form as obtained by mixing all components in an apparatus like an extruder; the advantage being a composition with homogeneous and well-defined concentrations of the additives.

With melt-mixing is meant that the propylene-based polymer and the ethylene-based polymer are melt-mixed with other components at a temperature that exceeds the melting point of the propylene-based polymer and the ethylene-based polymer. Melt-mixing may be done using techniques known to the skilled person, for example in an extruder. Generally, in the process of the invention, melt-mixing is performed at a temperature in the range from 200° C. to 260° C. Suitable conditions for melt-mixing, such as temperature, pressure, amount of shear, screw speed and screw design when an extruder is used are known to the skilled person.

In a certain embodiment, the present invention also relates to a process for manufacturing of a shaped article, wherein the process comprises a step of injection moulding the polymer composition according to the invention to form an article.

The invention also relates to an article comprising the polymer composition according to the invention, preferably wherein the article is an automotive interior or exterior article. For example, the article may be an airbag cover, a console part, an instrument panel cover, or a facia.

In a certain embodiment, the invention also relates to the use of the polymer composition according to the invention for the improvement of the Izod impact strength at −30° C. and/or the Izod impact strength at −40° C. of an article, wherein the Izod impact strength is determined in accordance with ISO 180 (2019) 1A.

The invention also relates to the use of an ethylene-based polymer having:
- a melt mass-flow rate of ≥3.0 and ≤30.0 g/10 min, as determined in accordance with ASTM D1238 (2013) at 190° C. under a load of 2.16 kg;
- a density of ≥840 and ≤870 kg/m$^3$, preferably of ≥850 and ≤860, as determined in accordance with ASTM 0792 (2008); and
- a content of ≥25.0 and ≤50.0 wt % of moieties derived from 1-octene, with regard to the total weight of the ethylene-based polymer for the improvement of the Izod impact strength at −30lC and/or the Izod impact strength at −40° C. of an article, wherein the Izod impact strength is determined in accordance with ISO 180 (2019) 1 A.

The invention will now be illustrated by the following non-limiting examples.

Materials

| Propylene-based polymers | |
|---|---|
| HECO-1 | A heterophasic propylene-based polymer prepared as described below |
| HECO-2 | A heterophasic propylene-based polymer prepared as described below. |
| HECO-3 | SABIC ® PP 48N10, a commercially available heterophasic propylene copolymer in which the matrix consists of a propylene homopolymer |
| HECO-4 | SABIC ® PP 612MK10, a commercially available heterophasic propylene copolymer in which the matrix consists of a propylene homopolymer |
| HECO-5 | SABIC ® PP 95610, a commercially available hetero phasic propylene copolymer in which the matrix consists of a propylene homopolymer |
| Ethylene-based polymers | |
| POE1 | SABIC ® FORTIFY ™ C5055D, a commercially available ethylene-1-octene copolymer |
| POE2 | SABIC ® FORTIFY ™ C1055D, a commercially available ethylene-1-octene copolymer |
| Filler | |
| Talc 1 | HTPultra 5c, a commercially available ultrafine talc from IMI FABI, having a mean particle size D$_{50}$ of 0.65 µm as determined via sedimentation analysis, Stokes' law, per ISO 13317-3 (2001) |
| Talc 2 | Luzenac HAR T84, a commercially available high aspect ratio talc from Imerys Talc, having a mean particle size D$_{50}$ of 2 µm as determined via sedimentation analysis, Stokes' law, per ISO 13317-3 (2001) |

Measurements

The tensile modulus was determined according to ISO 527/1 A with samples in the parallel orientation of injection moulding. The test specimen dimensions were injected on 150*10*4 mm according to ISO 527/1 A.

Impact strength (Izod impact) was determined by measuring the Izod impact strength at −40° C., according to ISO 180 1A, Cut tensile bar: Test geometry: 80*10*4 mm, notch 45° according to ISO 37/2 perpendicular orientation.

NMR: Amount of Propylene-Based Matrix and Dispersed Ethylene α-Olefin Copolymer in the HECO Polymers The amount of the propylene-based matrix, the amount of ethylene incorporated into the dispersed ethylene-α-olefin copolymer (also referred to herein as 'rubber phase') (RCC2) and the dispersed ethylene-α-olefin copolymer (RC) were determined by $^{13}$C-NMR spectroscopy. To this end, approximately 150 mg of material was dissolved in 1,1,2,2-tetrachloroethane-d2 (TCE-d2). To ensure a homogeneous solution, the sample preparation has been conducted in a heated rotary oven. The NMR measurements were carried out in the solution-state using a Bruker 500 Advance III HD spectrometer operating at 500.16 and 125.78 MHz for $^1$H and $^{13}$C, respectively, and equipped with a 10 mm DUAL cryogenically-cooled probe head operating at 125° C. The $^{13}$C-NMR experiments were performed using standard single pulse excitation utilizing the NOE and bi-level WALTZ16 decoupling scheme (Zhou Z. et al. J. Mag. Reson 187 (2007) 225. A total of 512 transients were acquired per spectrum. The spectra were calibrated by setting the central signal of TCE's triplet at 74.2 ppm. Quantitative $^{13}$C NMR spectra were processed, integrated and relevant quantitative properties determined from the integrals using proprietary computer programs.

The MFI of the heterophasic propylene copolymer was determined at 230° C. and 2.16 kg according to ISO 1133: 2011.

The MFIrubber was calculated according to the following formula 1:

$$MFIrubber = 10^{\left(\frac{\text{Log } MFIheterophasic - \text{matrix content} * \text{Log } MFImatrix}{\text{rubber content}}\right)}$$

wherein
MFIheterophasic is the MFI (dg/min) of the heterophasic propylene copolymer measured according to ISO1133-1:2011 (2.16 kg/230° C.),
MFImatrix is the MFI (dg/min) of the propylene-based matrix measured according to ISO1133-1:2011 (2.16 kg/230° C.),
matrix content is the fraction of the propylene-based matrix in the heterophasic propylene copolymer,
rubber content is the fraction of the dispersed ethylene-α-olefin copolymer in the heterophasic propylene copolymer. For the avoidance of any doubt, Log in the formula means $\log_{10}$.

With fraction is meant the amount as compared to 1, so for example if the propylene-based matrix is present in an amount of 89 wt % based on the heterophasic propylene copolymer, the fraction is 0.89.

FTIR

The total content of ethylene (TC2) in the heterophasic propylene copolymer composition was determined using quantitative fourier transform infrared (FTIR) spectroscopy. The FTIR spectoscopy was performed on pressed films (preparation described below) on a Perkin Elmer Spectrum 100 FTIR scanning between 4400 and 400 cm−1 with a spectral resolution of 4 cm−1 and 16 accumulations.

For the preparation of the FTIR samples, 275 mg of sample material was pressed into a film between Teflon foils. Specac constant thickness filmmaker with an F-spacer was operated at 175° C. A 1 minute preheat time and a 1 minutes press time were used. A pressure of 2 tons was used. The film was removed from the hot press with a tweezer and allowed to cool down to room temperature. After cooling, both teflon foils were removed.

Calibration of FTIR was achieved by correlation to comonomer contents determined by quantitative nuclear magnetic resonance (NMR) spectroscopy.

The calibration procedure based on the results obtained from quantitative $^{13}$C NMR spectroscopy was undertaken in the conventional manner well documented in the literature.

The amount of comonomer (N) was determined as weight percent via $$N = k1(A/R) + k2 \quad \text{Formula (2)}$$

wherein A is the integral area defined of the comonomer band, R the integral area defined as the reference band and k1 and k2 linear constants obtained by calibration. The band used for ethylene content quantification used was 750-705 cm−1. The reference band was 4095-4020 cm−1.

Isotacticity 175 mg of the polypropylene granules was dissolved in 3 ml at 130° C. in deuterated tetrachloroethylene (C2D2Cl4) containing 2,6-Di-tert-butyl-4-methylphenol (BHT) (5 mg BHT in 200 ml C2D2CL). The 13C NMR spectrum was recorded on a Bruker Avance 500 spectrometer equipped with a cryogenically cooled probe head operating at 125° C. The isotacticity of the mmmm pentad levels was determined from the 13C NMR spectrum in % based on the total pentad amount.

TABLE 1a

Properties of the heterophasic propylene copolymers.

|  | HECO-1 | HECO-2 | HECO-3 | HECO-4 | HECO-5 |
|---|---|---|---|---|---|
| Isotacticity of the matrix (%) | >96.5 | >96.5 | >96.5 | >96.5 | >96.5 |
| MFI (dg/min) | 40 | 81 | 13.8 | 33 | 5.5 |
| RC (wt %) | 21.7 | 12.4 | 16.3 | 18.5 | 33 |
| RCC2 (wt %) | 60 | 51.7 | 49.0 | 44.1 | 55 |
| TC2 (wt %) | 13 | 6.4 | 8.0 | 10.1 | 17 |

TABLE 1b

Properties of the ethylene-based polymers

|  | POE-1 | POE-2 |
|---|---|---|
| Density (kg/m$^3$) | 857 | 857 |
| MFI (g/10 min, @ 2.16 kg, 190° C.) | 5.0 | 1.0 |
| 1-octene content (wt %) | 41.0 | 41.0 |
| M$_w$ (g/mol) | 107,600 | 157,800 |
| M$_n$ (g/mol) | 53,600 | 70,500 |
| M$_w$/M$_n$ | 2.0 | 2.2 |

CMB: Color Masterbatch

Preparation of HECO 1 and HECO 2

HECO-1 and HECO-2 are heterophasic propylene copolymers prepared in an Innovene™ process, wherein a sequential two-reactor setup was employed. Polypropylene homopolymers were produced in first reactor and propylene-ethylene copolymers were produced in the second reactor.

There were three components in the catalyst system in the polymerization process: A procatalyst, an external electron donor and a co-catalyst. The procatalyst was prepared according to the description in WO2016198344, page 36, "Procatalyst III" paragraph; The external electron donor used for HECO-1 was di(iso-propyl) dimethoxysilane (DiPDMS), the external electron donor used for HECO-2 was n-propyltriethoxysilane (nPTES); the co-catalyst was triethylaluminium.

The process conditions of preparation of HECO-1 and HECO-2 are given in Table 2:

TABLE 2

Preparation of HECO-1 and HECO-2.

| Polymer | HECO-1 | HECO-2 |
|---|---|---|
| R1 Te (° C.) | 66 | 69.5 |
| R1 Pr (Bar) | 24 | 24 |
| Al/Ti (mol/mol) | 135 | 135 |
| Si/Ti (mol/mol) | 10 | 10 |
| R1 H2/C3 (mol/mol) | 0.08 | 0.065 |
| R1 split (wt %) | 80 | 86 |
| R2 Te (° C.) | 66 | 59 |
| R2 Pr (Bar) | 24 | 24 |
| R2 H2/C3 (mol/mol) | 0.132 | 0.0042 |
| R2 C2/C3 (mol/mol) | 0.63 | 0.31 |
| R2 split (wt %) | 20 | 14 |

In Table 2, R1 refers to the first reactor, R2 refers to the second reactor, Te refers to temperature, Pr refers to pressure, Al/Ti is the molar ratio of the co-catalyst to the procatalyst, Si/Ti is the molar ratio of the external donor to the procatalyst, H2/C3 is the molar ratio of hydrogen to propylene, C2/C3 is the molar ratio of ethylene to propylene, split is the amount of substance produced in R1 or R2 based on the amount of the total Polymer HECO-1 or HECO-2 respectively.

Additive Package:

The additive package used consists of 50 wt % color masterbatch, 20 wt % heat and process stabilizers, 10 wt % UV stabilizer, 20 wt % processing aid based on the total additive package.

The compositions of examples E1, E2, CE1 and CE2 were prepared extruding the HECOs with the POEs in a twin screw ZE25 extruder with the additive package according to the formulation in Table 3.

TABLE 3

Formulation of examples E1 and E2 and comparative examples CE1 and CE2.

|  |  | E1 | CE1 | E2 | CE2 |
|---|---|---|---|---|---|
| HECO-1 | wt % |  |  | 20.6 | 20.6 |
| HECO-2 | wt % |  |  | 30 | 30 |
| HECO-3 | wt % | 26 | 26 | 15 | 15 |
| HECO-4 | wt % | 22 | 22 |  |  |
| HECO-5 | wt % | 10 | 10 |  |  |
| POE-1 | wt % | 20 |  | 18 |  |
| POE-2 | wt % |  | 20 |  | 18 |
| talc-1 | wt % | 18 | 18 |  |  |
| talc-2 | wt % |  |  | 13 | 13 |
| additives | wt % | 2 | 2 | 1.4 | 1.4 |
| CMB | wt % | 2 | 2 | 2 | 2 |

Prior to dosing to the hopper of the extruder, for all examples, the talcum, POE and additive package were mixed with the HECOs.

The properties of the formulations of Table 3 are reported in Table 4:

TABLE 4

Properties of the formulations of examples E1 and E2 and comparative examples CE1 and CE2.

|  |  | E1 | CE1 | E2 | CE2 |
|---|---|---|---|---|---|
| Izod impact −40° C. | kJ/m² | ++ | + | ++ | + |
| Tensile modulus | N/mm² | + | + | + | + |

+: good
++: improved as compared to the comparative example

Results

As can be seen from the above table, the polymer composition according to the invention shows an improved Izod impact at −40° C., while at the same time maintaining a good tensile modulus. Such composition is very suitable for use in automotive interior applications that require a superior low temperature impact strength.

The invention claimed is:

1. Polymer composition comprising:
    (a) a propylene-based polymer having a melt mass-flow rate of ≥5.0 and ≤90.0 g/10 min, as determined in accordance with ASTM D1238 (2013) at 230° C. under a load of 2.16 kg; and
    (b) ≥5.0 and ≤30.0 wt %, with regard to the total weight of the polymer composition, of an ethylene-based polymer having:
        a melt mass-flow rate of ≥3.0 and ≤30.0 g/10 min, as determined in accordance with ASTM D1238 (2013) at 190° C. under a load of 2.16 kg;
        a density of ≥840 and ≤870 kg/m³, as determined in accordance with ASTM D792 (2008); and
        a content of ≥25.0 and ≤50.0 wt % of moieties derived from 1-octene, with regard to the total weight of the ethylene-based polymer,
    wherein the ethylene-based polymer has:
        a weight-average molecular weight ($M_w$) of ≥90,000 and ≤110,000 g/mol, as determined in accordance with ASTM D6474 (2012);
        a number-average molecular weight ($M_n$) of ≥40,000 and ≤70,000 g/mol, as determined in accordance with ASTM D6474 (2012); and/or
        a molecular weight distribution ($M_w/M_n$) of ≤2.1.

2. Polymer composition according to claim 1, wherein the polymer composition comprises a filler.

3. Polymer composition according to claim 1, wherein the ethylene-based polymer has a density of ≥845 and ≤870 kg/m³.

4. Polymer composition comprising:
    (a) a propylene-based polymer having a melt mass-flow rate of ≥5.0 and ≤90.0 g/10 min, as determined in accordance with ASTM D1238 (2013) at 230° C. under a load of 2.16 kg; and
    (b) ≥5.0 and ≤30.0 wt %, with regard to the total weight of the polymer composition, of an ethylene-based polymer having:
        a melt mass-flow rate of ≥3.0 and ≤30.0 g/10 min, as determined in accordance with ASTM D1238 (2013) at 190° C. under a load of 2.16 kg; and
        a density of ≥840 and ≤870 kg/m³, as determined in accordance with ASTM D792 (2008),
    wherein the ethylene-based polymer comprises ≥35.0 and ≤45.0 wt % of moieties derived from 1-octene, with regard to the total weight of the ethylene-based polymer.

5. Polymer composition according to claim 1, wherein the polymer composition comprises ≥15.0 and ≤30.0 wt %, with regard to the total weight of the polymer composition, of the ethylene-based polymer.

6. Polymer composition according to claim 1, wherein the polymer composition comprises ≥30.0 and ≤95.0 wt % of the propylene-based polymer with regard to the total weight of the polymer composition.

7. Polymer composition according to claim 1, wherein the propylene-based polymer is a propylene homopolymer, a random copolymer of propylene with ethylene, 1-butene and/or 1-hexene, a heterophasic propylene copolymer, or mixtures thereof.

8. Polymer composition according to claim 1, wherein the propylene-based polymer is a heterophasic propylene copolymer consisting of a matrix phase and a dispersed phase, wherein:
    the matrix phase comprises moieties derived from propylene;
    the dispersed phase is an ethylene-α-olefin copolymer comprising moieties derived from ethylene and moieties derived from an α-olefin having 3 to 8 carbon atoms; and
    the matrix phase forms the continuous phase.

9. Polymer composition according to claim 1, wherein the ethylene-based polymer has a fraction that is eluted in analytical temperature rising elution fractionation (a-TREF) at a temperature ≤30.0°° C. of ≤7.5 wt %.

10. Polymer composition according to claim 1, wherein the ethylene-based polymer has a single distinct peak in the a-TREF curve in the elution temperature range of between 50.0 and 90.0° C.

11. Process for manufacturing of a shaped article, wherein the process comprises a step of injection moulding the polymer composition according to claim 1 to form an article.

12. Article comprising the polymer composition according to claim 1.

13. Polymer composition according to claim 1, wherein the propylene-based polymer has a melt mass-flow rate of ≥10.0 and ≤50.0 g/10 min, as determined in accordance with ASTM D1238 (2013) at 230° C. under a load of 2.16 kg.

14. Polymer composition according to claim 1, wherein the polymer composition comprises ≥10.0 and ≤20.0 wt % of talc, with regard to the total weight of the polymer composition.

15. Polymer composition according to claim 1, wherein the ethylene-based polymer has a density of ≥845 and ≤865 kg/m³.

16. Polymer composition according to claim 1, wherein the ethylene-based polymer has a density of ≥850 and ≤865 kg/m³.

17. Polymer composition according to claim 8, wherein the α-olefin is propylene.

18. Polymer composition according to claim 12, wherein the article is an automotive interior or exterior article.

19. Polymer composition according to claim 1, wherein the $M_w$ of the ethylene-based polymer is ≥90,000 and ≤110,000 g/mol, as determined in accordance with ASTM D6474 (2012).

20. Polymer composition according to claim 1, wherein the $M_n$ of the ethylene-based polymer is ≥45,000 and ≤60,000 g/mol, as determined in accordance with ASTM D6474 (2012).

* * * * *